(12) United States Patent
Wen et al.

(10) Patent No.: US 7,580,411 B2
(45) Date of Patent: Aug. 25, 2009

(54) NETWORK FLOW/STREAM SIMULATION METHOD

(75) Inventors: Chang-Chung Wen, Tao-Yuan Hsien (TW); Tzu-Jian Yang, Taipei Hsien (TW); Wei-Tai Chang, Kao-Hsiung Hsien (TW); Cheng-Hung Tu, Hsin-Chu Hsien (TW)

(73) Assignee: DrayTek Corp., Hu-Kou County, Hsin-Chu Industrial Park, Hsin-Chu Hsien (TW)

( * ) Notice: Subject to any disclaimer, the term of this patent is extended or adjusted under 35 U.S.C. 154(b) by 418 days.

(21) Appl. No.: 11/556,205

(22) Filed: Nov. 3, 2006

(65) Prior Publication Data

US 2007/0097982 A1    May 3, 2007

Related U.S. Application Data

(60) Provisional application No. 60/596,997, filed on Nov. 3, 2005.

(51) Int. Cl.
*H04L 12/28* (2006.01)
(52) U.S. Cl. .................. 370/394; 370/400; 370/401
(58) Field of Classification Search .......... None
See application file for complete search history.

(56) References Cited

U.S. PATENT DOCUMENTS

2004/0006643 A1* 1/2004 Dolson et al. ............. 709/246

2004/0049596 A1* 3/2004 Schuehler et al. .......... 709/238
2004/0133713 A1* 7/2004 Elzur ....................... 710/52
2005/0002412 A1* 1/2005 Sagfors et al. ............ 370/437
2005/0160289 A1* 7/2005 Shay ....................... 713/201
2005/0286527 A1* 12/2005 Tieu et al. .................. 370/394

FOREIGN PATENT DOCUMENTS

CN        1617525 A       5/2005

OTHER PUBLICATIONS

Ptacek et al., "Insertion, Evasion, and Denial of Service: Eluding Network Intrusion Detection", 1998, pp. 1-3.*

* cited by examiner

*Primary Examiner*—Jayanti K Patel
*Assistant Examiner*—Jung Park
(74) *Attorney, Agent, or Firm*—Winston Hsu

(57) ABSTRACT

Before packets enter a router, a packing limiting unit abandons out-of-order packets, decreases a window size, and stores temperately part of said out-of-order packets for having packets pass the packet limiting unit with a better efficiency and a precise order. After packets enter said router, a packet retransmission processing unit acquires a characteristic values and messages calculated from each characteristic value of a packet for obtaining the order, size, header, and check bits for assisting in identifying packets, and stores the characteristic values with a link list for saving memory utility. With both the abovementioned methods, problems of out-or-order and retransmission during packets are transmitted, and of an over-used amount of memory, are solved.

19 Claims, 6 Drawing Sheets

NETWORK FLOW/STREAM SIMULATION METHOD

CROSS REFERENCE TO RELATED APPLICATIONS

This application claims the benefit of U.S. provisional application No. 60/596,997, filed on Nov. 3, 2005.

BACKGROUND OF THE INVENTION

1. Field of the Invention

The present invention relates to a network flow/stream simulation method, and more particularly, to a network flow/stream simulation method for arranging packets in order and for processing retransmitted packets to save utilized memory.

2. Description of the Prior Art

Growth of the Internet has helped people in many aspects. However, conventional computer apparatuses and private personal data are vulnerable in various networks, and therefore, there are various solutions for improving defense of said conventional computer apparatuses and private personal data. For example, antivirus software and software firewalls, or firewall technologies and anti-hacking functions built in hardware, are conventional solutions for defense. For network hardware apparatuses, a firewall technology takes packets in units, and analyzes contents of the packets. However, for anti-hacking technologies, abilities of both recombining packets and detecting consecutive packets are required besides firewall technologies. It indicates the fact that intrusive and malicious programs, which are designed by hackers, may be split into pieces during transmission, and moreover, the pieces may be out of sequence or missing during said transmission by following network structures and related environments. Therefore, conventional intrusion detection technologies must acquire abilities of recognizing missing or out of sequence patterns, and after packets are arranged in order with said conventional intrusion detection technologies, the packets are transmitted into an analysis engine for achieving an aim of both restoring data from pieces and analyzing data precisely. Moreover, anti-virus walls technologies based on gateways require similar technologies. For relieving missing and out of sequence packets, reliable transmission protocols thus become primary communication protocols in network transmission.

Current intrusion detection technologies applied on reliable transmission protocols are primarily classified into two types. A first type of intrusion detection technologies is based on the aid of sockets and proxies. For example, a technology includes applying routers or proxies as terminals, and restoring original data of packets with the aid of sockets and proxies applying Transmission Control Protocol/Internet Protocol (TCP/IP) is of the first type. A defect of the technology of the first type lies in the fact that a large amount of memory is required for storing packets to relieve missing and out of sequence packets. Moreover, Transmission Control Protocol/Internet Protocol lies on a third layer of the Open Systems Interconnection Model (OSI Model) so that a large amount of time is taken for transmitting data between upper layers and lower layers of the Open Systems Interconnection Model. A second type of intrusion detection technologies primarily utilizes queues for processing packets, and utilizes a huge amount of memory for storing packets to simulate sessions of a network, i.e., simulate possible situations about packets between different terminals. The possible situations are classified into flows between terminals, a status of a sliding window utilized by a terminal, and processing missing and out of sequence packets with packets buffered by routers and proxies, where said missing and out of sequence packets are not transmitted to sockets so that sessions between terminals utilizing Transmission Control Protocol/Internet Protocol are simulated. Both the abovementioned types of intrusion detection technologies requires a lot in both memory and performance, and moreover, the second type technology cannot be utilized for effectively relieving problems caused by retransmission. If retransmitted and out of sequence packets can be effectively and simultaneously relieved, and if an amount of utilized memory is significantly decreased, packet retransmission is not to be ignored easily even under insufficient resources. Besides, a related defensive ability is not reduced, and the efficiency of simulating sessions is not lowered either.

In the prior art, an intrusion detection application called Snort is provided. Snort is utilized for implementing both real-time network flow/stream detection and packet management on Internet Protocol. Snort implements the packet management with both queues and packets, as mentioned before. Besides, Snort may also implement detections of various communication protocols by searching for characteristics of packets to prevent various malicious attacks hidden inside said packets. However, Snort lacks the integrated ability of simulating the abovementioned sessions, and thus cannot be utilized for handling packet retransmission caused by missing packets. Based on the abovementioned reasons, Snort is merely utilized as an intrusion detection system other than an intrusion-prevention system. The same bottlenecks are also met even if in-line Snort is continuously researched.

Moreover, packets processed by an apparatus and then missed result in packet retransmission requests sent by clients of both reception and transmission. However, even if retransmitted packets have been respectively checked by anti-virus software and scan engines, other unexpected defects in security caused by said retransmitted packets also exist while the apparatus handles out of sequence packets.

SUMMARY OF THE INVENTION

The claimed invention provides a network flow/stream simulation method for arranging packets in order before the packets enter an apparatus. The method comprises abandoning packets having serial numbers out of sequence with serial numbers of other packets, transmitting a request to a client for retransmitting missing packets, reducing a size of a window regulated by a communication protocol applied by the client, and utilizing a queue for buffering packets having out of sequence serial numbers.

The claimed invention provides a network flow/stream simulation method for processing retransmitted packets to save utilized memory after packets arrive at an apparatus. The method comprises (a) a packet retransmission processing unit receiving an n-th packet from a packet limiting unit, (b) decreasing the window size of the processed packet, (c) confirming whether the n-th packet includes a confirmation signal, (d) confirming whether a link list includes confirmed characteristic values when the n-th packet includes the confirmation signal in step (c), (d1) selectively deleting certain confirmed characteristic values for preserving certain updated characteristic values while certain packets are lost after passing the apparatus, (e) removing confirmed characteristic values when the link list includes the confirmed characteristic values, (f) confirming whether there are contents in the link list, (g) comparing the serial number of the n-th packet with serial number domains of each characteristic value in the link list when there are contents in the link list in step (f), or when the n-th packet does not include the confirmation signal in step (c), (h) checking whether the serial number of the n-th packet is a tracked serial number of the link list, (i) the apparatus checking whether the length of the link list exceeds a predetermined length when the serial number of the n-th packet is a tracked serial number of the link list in step (h), (j) the apparatus calculating characteristic values of packets and storing the packets in the link list in serial number sequence when the length of the link list does not exceed the predetermined length in step (i), (k) transmitting the n-th packet when there is no content in the link list in step (f), or after the apparatus has stored the characteristic values of the packets in the link list in step k), (l) checking whether contents in the n-th packet are overlapped with a corresponding serial number domain of a k-th item in a specific characteristic value of the link list when the serial number of the n-th packet is not the tracked serial number of the link list in step (h), (m) abandoning the n-th packet when the contents of the n-th packet are not overlapped with the corresponding serial number domain of a k-th item in a specific characteristic value of the link list in step (l), or when the length of the link list exceeds the predetermined length in step (i), (n) confirming how the contents of the n-th packet are overlapped with the corresponding serial number domain of the k-th item in the specific characteristic value of the link list when contents in the n-th packet are overlapped with the corresponding serial number domain of the k-th item in the specific characteristic value of the link list in step (l), or storing a temporary packet of the k-th item to generate a L-th packet before confirming the overlapped degree, wherein the L-th packet is generated from the n-th packet or the temporary packet of the k-th item, (o) comparing lengths of both the L-th packet and the k-th item when the serial number of the L-th packet is matched with a beginning serial number of the k-th item of the specific characteristic value in step (n), (p) calculating a check code of the characteristic value of the L-th packet, and checking whether the calculated check code is matched with a check code of the k-th item when the lengths of the L-th packet and the k-th item are equal in step (o), (q) transmitting the L-th packet when the calculated check code is matched with the check code of the k-th item in step (p), (r) storing the L-th packet in a temporary packet of the k-th item when the length of the L-th packet is shorter than the length of the k-th item in step (o), (s) confirming whether the register packet temporary packet of the k-th item is matched with the length of the k-th item, (t) waiting for a timeout message when the L-th packet is not matched with the length of the k-th item in step (s), and abandoning the L-th packet when the timeout message appears, (u) separating the L-th packet into an i-th packet and a j-th packet when the length of the L-th packet is longer than the length of the k-th item in step (o), wherein the i-th packet starts at a serial number of the L-th packet, a length of the i-th packet equals to the length of the k-th item, and a length of the j-th packet equals to a difference generated by subtracting the length of the L-th packet by the length of the k-th item, (v) recognizing both the i-th packet and the j-th packet, and performing step (p) on the i-th packet after the i-th is recognized, (w) checking whether the k-th item is the last item of the link list for the j-th packet after recognizing the j-th packet in step (v); and performing step (i) on the j-th packet when the k-th item is the last item of the link list, otherwise, performing step (n) on the j-th packet, (x1) separating the L-th packet into a x-th packet and a y-th packet when the serial number of the L-th packet falls within a serial number domain of the k-th item of a specific characteristic value in the link list, wherein the x-th packet starts at the serial number of the L-th packet and ends at the end of the k-th item, and the length of the y-th packet equals the difference generated by subtracting the length of the L-th packet by the length of the x-th packet, (x2) recognizing the x-th packet and the y-th packet, and performing step (r) on the x-th packet after the x-th packet is recognized, (x3) checking whether the k-th item is the last item of the link list for the y-th packet, and performing step (i) on the y-th packet when the k-th item is the last item of the link list, otherwise, performing step (n) on the y-th packet, (y1) separating the L-th packet into a s-th packet and a t-th packet, wherein the t-th packet starts at a start serial number of the k-th item and ends at a tail serial number of the L-th packet, and the s-th packet starts at a start serial number of the L-packet and ends at a tail serial number of the k-th item, and (y2) recognizing the s-th packet and the t-th packet, and performing step (n) on the t-th packet after recognizing the t-th packet.

The claimed invention also provides a network flow/stream simulation method for arranging packets in order before the packets enter an apparatus and for processing retransmitted packets to save utilized memory after packets arrive at the apparatus. The method comprises (z1) abandoning packets having serial numbers out of sequence with serial numbers of other packets, (z2) transmitting a request to a client for retransmitting missing packets, (z3) reducing a size of a window regulated by a communication protocol applied by the client, (z4) utilizing a queue for buffering packets having out of sequence serial numbers, (a) a packet retransmission processing unit receiving an n-th packet from a packet limiting unit, (b) decreasing the window size of the processed packet, (c) confirming whether the n-th packet includes a confirmation signal, (d) confirming whether a link list includes confirmed characteristic values when the n-th packet includes the confirmation signal in step (c), (d1) selectively deleting certain confirmed characteristic values for preserving certain updated characteristic values while certain packets are lost after passing the apparatus, (e) removing confirmed characteristic values when the link list includes the confirmed characteristic values, (f) confirming whether there are contents in the link list, (g) comparing the serial number of the n-th packet with serial number domains of each characteristic value in the link list when there are contents in the link list in step (f), or when the n-th packet does not include the confirmation signal in step (c), (h) checking whether the serial number of the n-th packet is a tracked serial number of the link list, (i) the apparatus checking whether the length of the link list exceeds a predetermined length when the serial number of the n-th packet is a tracked serial number of the link list in step (h), (j) the apparatus calculating characteristic values of packets and storing the packets in the link list in serial number sequence when the length of the link list does not exceed the predetermined length in step (i), (k) transmitting the n-th packet when there is no content in the link list in step (f), or after the apparatus has stored the characteristic values of the packets in the link list in step (j), (l) checking whether contents in the n-th packet are overlapped with a corresponding serial number domain of a k-th item in a specific characteristic value of the link list when the serial number of the n-th packet is not the tracked serial number of the link list in step (h), (m) abandoning the n-th packet when the contents of the n-th packet are not overlapped with the corresponding serial number domain of a k-th item in a specific characteristic value of the link list in step (l), or when the length of the link list exceeds the predetermined length in step (i), (n) confirming how the contents of the n-th packet are overlapped with the corresponding serial number domain of the k-th item in the specific characteristic value of the link list when contents in the n-th packet are overlapped with the corresponding serial number domain of the k-th item in the specific characteristic value of the link list in step (l), or storing a temporary packet of the k-th item to generate a L-th packet before confirming the overlapped degree, wherein the L-th packet is generated from the n-th packet or the temporary packet of the k-th item, (o) comparing lengths of both the L-th packet and the k-th item when the serial number of the L-th packet is matched with a beginning serial number of the k-th item of the specific characteristic value in step (n), (p) calculating a check code of the characteristic value of the L-th packet, and checking whether the calculated check code is matched with a check code of the k-th item when the lengths of the L-th packet and the k-th item are equal in step (o), (q) transmitting the L-th packet when the calculated check code is matched with the check code of the k-th item in step (p), (r) storing the L-th packet in a temporary packet of the k-th item when the length of the L-th packet is shorter than the length of the k-th item in step (o), (s) confirming whether the temporary packet of the k-th item is matched with the length of the k-th item, (t) waiting for a timeout message when the L-th packet is not matched with the length of the k-th item in step (s), and abandoning the L-th packet when the timeout message appears, (u) separating the L-th packet into an i-th packet and a j-th packet when the length of the L-th packet is longer than the length of the k-th item in step (o), wherein the i-th packet starts at a serial number of the L-th packet, a length of the i-th packet equals to the length of the k-th item, and a length of the j-th packet equals to a difference generated by subtracting the length of the L-th packet by the length of the k-th item, (v) recognizing both the i-th packet and the j-th packet, and performing step (p) on the i-th packet after the i-th is recognized, (w) checking whether the k-th item is the last item of the link list for the j-th packet after recognizing the j-th packet in step (v); and performing step (i) on the j-th packet when the k-th item is the last item of the link list, otherwise, performing step (n) on the j-th packet, (x1) separating the L-th packet into a x-th packet and a y-th packet when the serial number of the L-th packet falls within a serial number domain of the k-th item of a specific characteristic value in the link list, wherein the x-th packet starts at the serial number of the L-th packet and ends at the end of the k-th item, and the length of the y-th packet equals the difference generated by subtracting the length of the L-th packet by the length of the x-th packet, (x2) recognizing the x-th packet and the y-th packet, and performing step (r) on the x-th packet after the x-th packet is recognized, (x3) checking whether the k-th item is the last item of the link list for the y-th packet, and performing step (i) on the y-th packet when the k-th item is the last item of the link list, otherwise, performing step (n) on the y-th packet, (y1) separating the L-th packet into a s-th packet and a t-th packet, wherein the t-th packet starts at a start serial number of the k-th item and ends at a tail serial number of the L-th packet, and the s-th packet starts at a start serial number of the L-packet and ends at a tail serial number of the k-th item, and (y2) recognizing the s-th packet and the t-th packet, and performing step (n) on the t-th packet after recognizing the t-th packet.

These and other objectives of the present invention will no doubt become obvious to those of ordinary skill in the art after reading the following detailed description of the preferred embodiment that is illustrated in the various figures and drawings.

DETAILED DESCRIPTION

The aim of the present invention is to provide a network flow/stream simulation method for relieving failures of intrusion detection systems, firewalls, anti-virus systems caused by out of sequence, missing, retransmitted packets, and for saving an amount of utilized memory.

The network flow/stream simulation method is applied on reliable transmission protocols, such as Transmission Control Protocol and Sequenced Packet Exchange (SPX) protocol. The exemplary protocols meet requirements of the reliable transmission protocols by means of both sequence and acknowledgement, and therefore, the network flow/stream simulation method of the present invention may be applied on said exemplary protocols.

The network flow/stream simulation method of the present invention is primarily classified into two parts, where a first part includes a procedure performed before packets arrive at a router, and a second part includes another procedure performed after the packets arrive at the router. In later descriptions, same data is separated into a plurality of packets having consecutive serial numbers, which are listed in monotonic increasing manner, at a transmission client. Note that the consecutive serial numbers may also be listed in other manners other than monotonic increasing in the present invention, such as monotonic decreasing.

Figure 1:
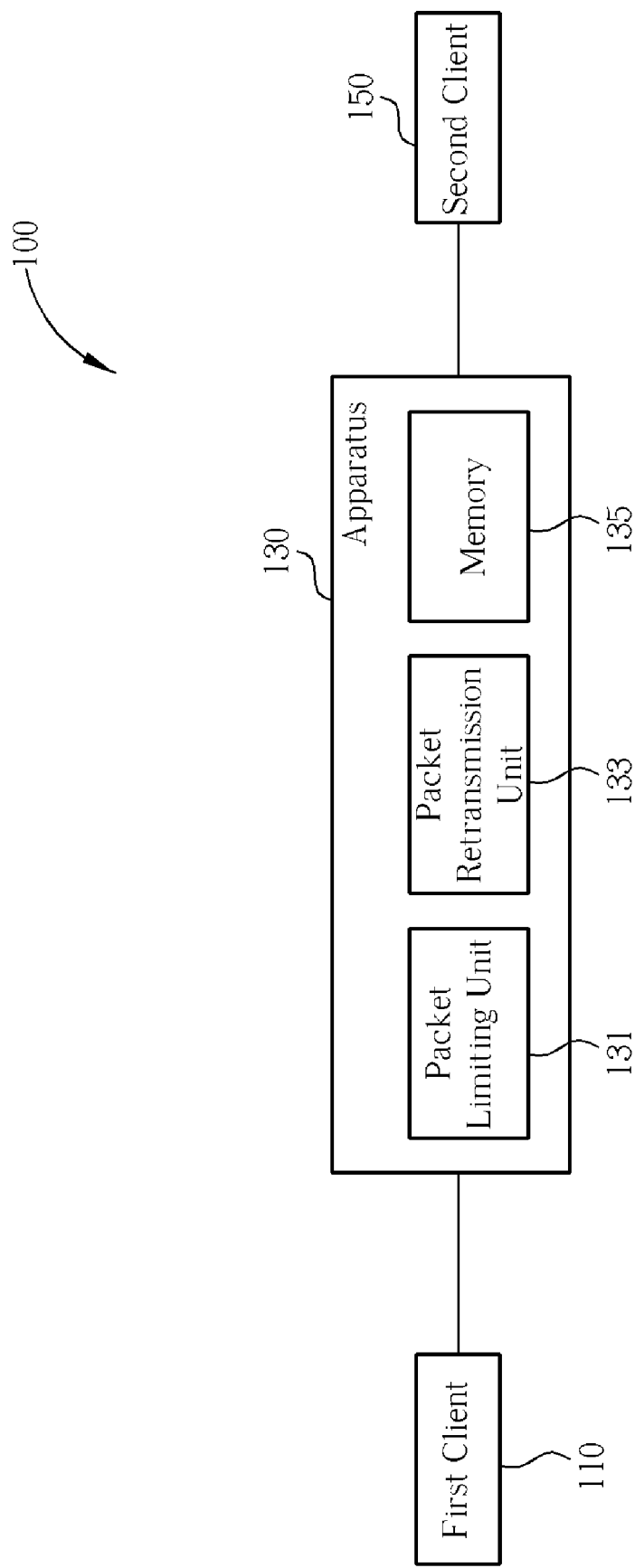
FIG. 1 is a diagram of a network structure utilizing the network flow/stream simulation method of the present invention.

Please refer to FIG. 1, which is a diagram of a network structure 100 utilizing the network flow/stream simulation method of the present invention. The network structure 100 includes a first client 110, an apparatus 130, and a second client 150. The first client 110 is a transmission terminal, whereas the second client 150 is a reception terminal. The apparatus 130 includes a packet limiting unit 131, a packet retransmission processing unit 133, and a memory 135. The apparatus 130 may be implemented with a router, a gateway, a proxy, or network hardware having similar functions, where all of them utilize the network flow/stream simulation method of the present invention. Both the first client 110 and the second client 150 may be computers or network hardware having similar functions. The packet limiting unit 131 is utilized for processing the first part of the network flow/stream simulation method of the present invention, i.e. the procedure before packets arrive at the apparatus 130, for ensuring that packets leaving the packet limiting unit 131 are arranged by following a sequence of corresponding serial numbers, and for ensuring said arranged packets remain the same as original data in the first client 110. Besides, the packet limiting unit 131 tracks a certain packet within all the time, and prevents any packet having a serial number larger than a serial number of said certain packet from passing the packet limiting unit 131. It indicates the fact that a first packet having a smaller serial number will pass through the packet limiting unit 131 earlier than a second packet having a larger serial number, for preventing output packets of the packet limiting unit 131 from being out of sequence. When a received packet of the packet limiting unit 131 has a serial number next to the serial number of the tracked packet, the tracked packet may pass through the packet limiting unit 131, and the received packet thus becomes a next tracked packet of the packet limiting unit 131. For example, when a tracked packet of the packet limiting unit 131 has a serial number N, which is a positive integer, and when a received packet of the packet limiting unit 131 has a serial number (N+1), the tracked packet having the serial number N may pass through the packet limiting unit 131 in advance, and the received packet having the serial number (N+1) thus becomes a next tracked packet; otherwise, when the tracked packet having the serial number N is missed, the received packet having the serial number (N+1) cannot pass the packet limiting unit 131 until another packet having the serial number N is received and sent outward by the packet limiting unit 131. However, the packet limiting unit 131 allows a packet having a serial number smaller than N to pass through the packet limiting unit 131 before the tracked packet having the serial number N passes through the packet limiting unit 131, and it indicates the fact that the packet having a serial number smaller than N is a retransmitted packet so that the packet having the serial number smaller than N has to be handled by the packet retransmission processing unit 133. Following the above-mentioned example and in brief, when a received packet having a serial number (N-a) arrives at the packet limiting unit 131, where a is a positive integer smaller than N, the packet limiting unit 131 sends the received packet having the serial number (N-a) to the packet retransmission processing unit 133 in advance since the received packet having the serial number (N-a) is a retransmitted packet. Note that the packet retransmission processing unit 133 is utilized for handling retransmitted packets. Thus it can be seen that the packet retransmission processing unit 133 receives two types of packets, where a first type of received packets are in sequence packets processed by the packet limiting unit 131, and a second type of received packets are packets that have been sent outward by the apparatus 130. The second type of received packets are resulted from an unstable network environment so that said second type of received packets are missed after being sent outward by the apparatus 130. For retrieving back the missed packets of the second type, the second client 150 sends a request to the first client 110 for retransmitting the missed packet, whereas the first client 110 automatically retransmits the missed packet also. However, since anti-virus programs and intrusion-detection programs have been executed on the missed packet in the apparatus 130, security defects are generated by arbitrarily sending a retransmitted packet of the missed packet outward by the apparatus 130. Note that such security defects remain even if the retransmitted packet has been re-scanned with the same anti-virus programs and the same intrusion-detection programs. Therefore, the packet retransmission processing unit 133 is also designed for solving related problems caused by retransmitted packets.

Figure 2:
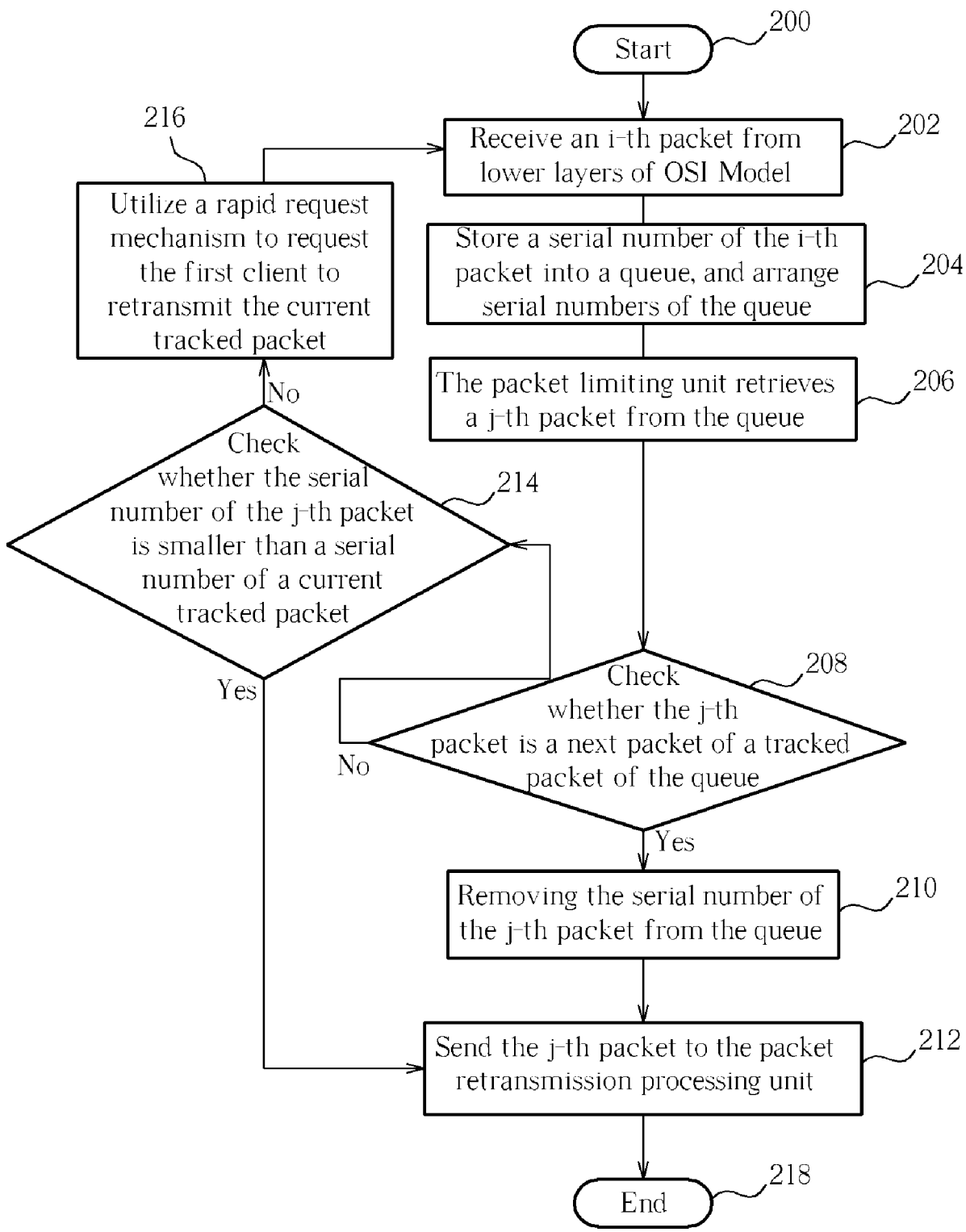
FIG. 2 is a flow chart of the network flow/stream simulation method of the present invention for performing a procedure before packets arrive at a router.

Please refer to FIG. 2, which is a flow chart of the network flow/stream simulation method of the present invention for performing a procedure before packets arrive at a router, and with referred to FIG. 1. The network flow/stream simulation method illustrated in FIG. 2 is primarily performed by the packet limiting unit 131, and includes steps as follows:

Step 200: Start.

Step 202: Receive an i-th packet from lower layers of Open Systems Interconnection Model.

Step 204: Store a serial number of the i-th packet into a queue, and arrange serial numbers of the queue to be in sequence after storing said serial number of the i-th packet.

Step 206: The packet limiting unit 131 retrieves a j-th packet from the queue in sequence of serial numbers.

Step 208: Check whether the j-th packet is a next packet of a tracked packet of the queue with the aid of both the serial number of the j-th packet and the tracked packet in the queue. When the j-th packet is a next packet of said tracked packet, go to Step 210; otherwise, go to Step 214.

Step 210: Remove the serial number of the j-th packet from the queue.

Step 212: Send the j-th packet to the packet retransmission processing unit 133.

Step 214: Check whether the serial number of the j-th packet is smaller than a serial of a current tracked packet. When whether the serial number of the j-th packet is smaller than the serial number of the current tracked packet, go to Step 218; otherwise, go to Step 216.

Step 216: Utilize a rapid request mechanism to request the first client 110 to retransmit the current tracked packet.

Step 218: End.

Steps illustrated in FIG. 2 are primarily executed with the packet limiting unit 131 shown in FIG. 1.

The steps shown in FIG. 2 are further explained as follows. A queue is utilized for buffering packets having out of sequence serial numbers. Packets having lost serial numbers may be ignored first. When a length of the queue exceeds a maximal length provided by the apparatus 130, an out of sequence packet buffered in the queue is abandoned. When the packet of a lost serial number is found, the packet of said lost serial number is inserted into the queue according to sequential serial numbers in the queue, and a last packet in the queue is abandoned. When a received packet is not a next packet with a currently tracked packet, a request is sent to the first client 110 by the apparatus 130 for retransmitting a lost packet having a serial number smaller than the serial number of said received packet. The next packet cannot be tracked in the queue until the lost packet is found and sent outward the apparatus 130.

For facilitating processing, packets from the first client 110 and received by the apparatus 130 are buffered in the queue in sequence of serial numbers. Since packets may be lost or be lead to different paths, said packets have different time arriving at the apparatus 130, and become out of sequence packets in the apparatus 130. The apparatus 130 stores packets into the queue in sequence of serial numbers for solving the out-of-sequence related problem, and moreover, missed packets are ignored with their serial numbers. Besides, since resources of the apparatus 130 are limited, i.e. the length of the queue is also limited, when the length of the queue is exceeded by storing a new packet, abandon a packet having a largest serial number in the queue. And when a latter-received packet has a lost serial number of the queue, insert said latter-received packet into the queue in sequence according to the serial number of said latter-received packet, and abandon a buffered packet having a largest serial number in the queue for maintaining the length of the queue. The length of the queue has a maximal value when there are unlimited resources in the apparatus 130, and a minimal value equal to a currently received packet.

Then packets buffered in the queue are retrieved from said queue in sequence of serial numbers, and are checked with their serial numbers one by one for ensuring consecutive serial numbers of the retrieved packets. While meeting a missed packet so that consecutive serial numbers cannot be ensured, a next packet cannot be retrieved from the queue until said missed packet is found. Therefore, packets sent outward from the packet limiting unit 131 are in sequence of serial numbers, and requirements of both intrusion detection and anti-virus mechanism are reached.

With respect to Request For Comments (RFC) specifications, the first client 110 cannot retransmit a missed packet until the first client 110 receives a timeout message. The first client 110 cannot retransmit the missed packet either when the first client 110 receives a confirm message of the missed packet from the second client 150. Therefore, it is time-consuming for the apparatus 130 to determine whether to send a request for retransmitting a missed packet. Therefore, the apparatus 130 sends a request to the first client 110 for having the first client 110 retransmit the missed packet as soon as possible. Note that the apparatus 130 may send a plurality of requests (or confirmation signals) directly for having the first client 110 retransmit the missed packet as soon as possible. In a preferred embodiment of the present invention, more than three confirmation signals are sent at once, for example: four confirmation signals are sent at once, where three latter confirmation signals from said four confirmation signals are copies of a first confirmation signal of said four confirmation signals.

Note that when the length of the queue just equals to a window size of an applied protocol, a utility rate of the memory 135 is maximal, and sessions between both the first client 110 and the second client 150 may be simulated completely. When the length of the queue is zero, i.e., when the queue is not utilized so that the utility rate of the memory 135 is minimal, and merely a current tracked packet is buffered, Steps 204, 206, 210 are not executed, i.e., merely Steps 200, 202, 208, 212, 214, 216, and 218 are executed, without affecting the ordinary execution of the network flow/stream simulation method of the present invention.

Among all steps shown in FIG. 2, a situation under a smallest length of the queue is described as follows. When a fore-abandoned packet is required to be accessed by the apparatus 130 right after being abandoned, huge time consumption is incurred along with sending retransmission requests. For preventing such time consumption, partial limited capacity of the memory 135 is utilized for storing certain out of sequence packets in the queue by following Step 204. The stored packets in Step 204 may be rapidly utilized in Step 204, 206, 208, and 210, and be rapidly removed from the queue for relieving the abovementioned time consumption. A maximal capacity of the queue may be adjusted dynamically according to various requirements of the apparatus 130. When the maximal capacity of the queue is reached, and when there is still one more packet need to be stored, a to-be-removed packet may be determined by priorities of the stored packets in the queue, and then there is room for storing the need-to-be-stored packet in the queue.

Note that a length of the queue mentioned in Step 204 may be dynamically adjusted according to how many resources the apparatus 130 has. Therefore, a minimal length of the queue is zero. The queue is utilized for reducing a probability of executing Step 216 for decreasing delay time resulted from retransmitting missed packets.

After the steps shown in FIG. 2 are executed by the packet limiting unit 131, packets transmitted from the packet limiting unit 131 to the packet retransmission processing unit 133 are ensured to be in sequence. However, retransmitted packets results in weakness of network security, and moreover, said retransmitted packet are not definitely the same with corresponding missed packets in both content and size. With limitations of resources of the apparatus 130, a conventional apparatus 130 is in lack of the ability of preserving certain capacity of memory for each session to manage packets, where the abovementioned intrusion detection software Snort acquires said ability. Therefore, a network flow/stream simulation method is also provided in the present invention for relieving defects caused by retransmitted packets, and is performed with the packet retransmission processing unit 133 shown in FIG. 1. Please refer to FIG. 3, FIG. 4, and FIG. 5, all of which illustrate a flow chart illustrating a network flow/stream simulation method provided in the present invention for relieving defects caused by retransmitted packets after packets arrive at the apparatus 130 shown in FIG. 1, and with referred to FIG. 1. Steps of the network flow/stream simulation method for relieving defects caused by retransmitted packets are listed as follows:

Step 300: Start.

Step 302: The packet retransmission processing unit 133 receives an n-th packet from the packet limiting unit 131.

Step 304: Decrease a size of processed windows.

Step 306: Confirm whether the n-th packet includes a confirmation signal. When the n-th packet includes the confirmation signal, go to Step 308; otherwise, go to Step 314.

Step 308: Confirm whether a link list includes confirmed characteristic values. When the link list includes confirmed characteristic values, go to Step 310; otherwise, go to Step 312.

Step 310: Remove confirmed characteristic values confirmed by the second client 150.

Step 312: Confirm whether there are contents in the link list. When there are contents in the link list, go to Step 314; otherwise, go to Step 322.

Step 314: Compare the serial number of the n-th packet with serial number domains of each characteristic value in the link list.

Step 316: Check whether the serial number of the n-th packet is a tracked serial number of the link list. When the serial number of the n-th packet is the tracked serial number of the link list, go to Step 318; otherwise, go to Step 324.

Step 318: The apparatus 130 checks whether the length of the link list exceeds a predetermined length. When the length of the link list exceeds the predetermined length, go to Step 326; otherwise, go to Step 320.

Step 320: The apparatus 130 calculates characteristic values of packets, and stores the packets in the link list in serial number sequence.

Step 322: Transmit the n-th packet.

Step 324: Check whether contents in the n-th packet are overlapped with a corresponding serial number domain of a k-th item in a specific characteristic value of the link list. When the contents in the n-th packet are overlapped with the corresponding serial number domain of the k-th item in the specific characteristic value of the link list, go to Step 330; otherwise, go to Step 326.

Step 326: Abandon the n-th packet.

Step 328: End.

Step 330: Confirm how the contents of the n-th packet are overlapped with the corresponding serial number domain of the k-th item in the specific characteristic value of the link list, or store a temporary packet of the k-th item to generate a L-th packet before confirming the overlapped degree, where the L-th packet is generated from the n-th packet or the temporary packet of the k-th item. When the serial number of the L-th packet is matched with a beginning serial number of the k-th item of the specific characteristic value, go to Step 332; when the serial number of the L-th packet falls within a serial number domain of the k-th item of a specific characteristic value in the link list, go to Step 356; and when the serial number of the L-th packet is smaller than a serial number domain of the k-th item of a smallest characteristic value in the link list, go to Step 362.

Step 332: Compare lengths of both the L-th packet and the k-th item. When the lengths of the L-th packet and the k-th item are equal, go to Step 334; when the length of the L-th packet is shorter than the length of the k-th item, go to Step 344; and when the length of the L-th packet is longer than the length of the k-th item, go to Step 350.

Step 334: Calculate a check code of the characteristic value of the L-th packet, and check whether the calculated check code is matched with a check code of the k-th item. When the calculated check code is matched with a check code of the k-th item, go to Step 336; otherwise, go to Step 338.

Step 336: Transmit the L-th packet.

Step 338: Check whether the L-th packet has been processed with Step 346. When the L-th packet has been processed with Step 346, go to Step 348; otherwise, go to Step 340.

Step 340: Abandon the L-th packet.

Step 342: End.

Step 344: Store the L-th packet in a temporary packet of the k-th item.

Step 346: Confirm whether the register packet of the k-th item is matched with the length of the k-th item. When the temporary packet of the k-th item is matched with the length of the k-th item, go to Step 334; otherwise, go to Step 348.

Step 348: Wait for a timeout message, and abandon the L-th packet when the timeout message appears, then go to Step 342.

Step 350: Separate the L-th packet into an i-th packet and a j-th packet, where the i-th packet starts at a serial number of the L-th packet, a length of the i-th packet equals to the length of the k-th item, and a length of the j-th packet equals to a difference generated by subtracting the length of the L-th packet by the length of the k-th item.

Step 352: Recognize both the i-th packet and the j-th packet, perform Step 334 on the i-th packet after the i-th is recognized, and perform Step 354 on the j-th packet after the j-th packet is recognized.

Step 354: Check whether the k-th item is the last item of the link list for the j-th packet. When the k-th item is the last item of the link list, abandon the j-th packet and go to Step 342; otherwise, perform Step 330 on the Step 330.

Step 356: Separate the L-th packet into an i-th packet and a j-th packet, where the i-th packet starts at the serial number of the L-th packet and ends at the end of the k-th item, and the length of the j-th packet equals the difference generated by subtracting the length of the L-th packet by the length of the i-th packet.

Step 358: Recognize the i-th packet and the j-th packet, perform Step 344 on the i-th packet after the i-th packet is recognized, and perform Step 360 on the j-th packet after the j-th packet is recognized.

Step 360: Check whether the k-th item is the last item of the link list for the j-th packet. When the k-th item is the last item of the link list, abandon the j-th packet and perform Step 342 on the j-th packet; otherwise, perform Step 330 on the j-th packet.

Step 362: Separate the L-th packet into an i-th packet and a j-th packet, where the j-th packet starts at a start serial number of the k-th item and ends at a tail serial number of the L-th packet, and the i-th packet starts at a start serial number of the L-packet and ends at a tail serial number of the k-th item.

Step 364: Recognize the i-th packet and the j-th packet. When the i-th packet is recognized, abandon the i-th packet and perform Step 342; and when the j-th packet is recognized, perform Step 330 on the j-th packet.

In the abovementioned steps, a characteristic value in a packet may be a data structure having a plurality of variables or a string. Information within the characteristic value may also be retrieved by inputting said characteristic value into specific algorithms, where said information includes a serial number of the packet, a header, a length of the header, a length of the packet, a check code, and etc. Note that different characteristic values must indicate different packets. Besides, in the network flow/stream simulation method of the present invention, characteristic values are stored in a link list so that different characteristic values indicate different items in said link list. When the characteristic value is implemented with a data structure, the abovementioned elements, such as the header and the length of the packet, are stored in said data structure in forms of variables, and are retrieved by inputting the characteristic value into corresponding algorithms, each of which is utilized for generating a corresponding element in the information related to the characteristic value. When the characteristic value is implemented with a string, various elements in the related information may also be respectively retrieved by inputting said string into various corresponding algorithm. Elements including a length of the packet, a header, and a check code may also be implicitly stored in the string. Note that the abovementioned check code utilized for the packet obeys properties of a vector space, such as the associativity law and the commutativity law, for satisfying the requirement of processing said check code with specific algorithms to perform confirmation. In certain embodiments of the present invention, the check code may be implemented with the checksum utilized in Transmission Control Protocol, or with a self-designed function in a vector space.

A serial number of a packet is not necessarily required for recognizing one packet from the others. With the aid of the property that different characteristic values must correspond to different packets, a retransmitted packet may be easily determined since said retransmitted packet must have a same serial number with a corresponding missed packet. While determining consecution related to serial numbers between different packets, with the aid of a properly-designed algorithm, serial number-related information may be easily retrieved by inputting characteristic values into said properly-designed algorithm, and said consecution between different packets is easily determined with the aid of said serial number-related information. For example, an algorithm or related characteristic values may be designed to acquire a property that a specific signature is retrieved only when two characteristic values of two consecutive packets are inputted into said algorithm, and therefore, said signature is utilized for proving the fact that both said packets are consecutive in serial numbers indeed. Note that single characteristic value may be utilized for covering a plurality of consecutive serial numbers.

The characteristic value utilized in the present invention is small in bits. Compared with the prior art, in most cases of the present invention, merely characteristic values are required to be stored, and merely covered serial number domains of the characteristic values are required to be queried for saving memory, whereas in the prior art, a huge amount of data is required to be stored in the memory, and a confirmation signal has to be waited for.

In the abovementioned steps, elements implicitly referred by characteristic values are utilized for recognizing different packets of same original data. After receiving the n-th packet, a characteristic value of the n-th packet is compared with pre-stored characteristic values in the link list by calculating both the characteristic value of the n-th packet and the pre-stored characteristic values in the link list with the aid of a specific algorithm. When a matched characteristic value is found, i.e. the characteristic value of the n-th packet, it indicates that the n-th packet is a retransmitted packet of a previous missed packet received by the apparatus 130. When no matched characteristic value is found, it indicates that the n-th packet is irrelevant with any packet corresponding to the stored characteristic values stored in the link list, and then the n-th packet is abandoned for reducing a processing amount. Compared elements referred by the characteristic value of the n-th packet may be a header of the n-th packet, or other header-related information such as contents or a length of said header of the n-th packet. Similar with the abovementioned descriptions, elements in the header-related information may also be inputted to specific corresponding algorithms for comparison. For example, when a header of certain packet is calculated by inputting a characteristic value into an algorithm, said certain packet should be the n-th packet when said header is just the header of the n-th packet or a partial segment of said header of the n-th packet. When a range of a length of a packet is calculated by inputting a characteristic into an algorithm, said packet should be the n-th packet also when the length of the n-th packet falls within said range. The abovementioned situations are merely embodiments of the present invention, and therefore, other similar comparisons about the characteristic value or other elements of the packet should not be limitations to the present invention.

Note that Step 304 may be executed or not, according to a length of the link list determined by how many resources are provided by the apparatus 130. When the apparatus 130 is short on resources, so that a length of the link list is shorter, a probability of missing packets may be significantly reduced by adjusting a size of a window regulated by an applied protocol.

Note that in Step 310, confirmed characteristic values may not be removed completely. By preserving a certain plurality of updated and confirmed characteristic values, the defect may be caused by missed confirmation signals. A number of preserved and confirmed characteristic values may also be adjusted according to how many resources the apparatus 130 has.

Note that in Step 344, after the L-th packet is stored in a temporary packet corresponding to the k-th item of a specific characteristic value, and when there are overlapped serial numbers between contents of both the L-th packet and the temporary packet, the L-th packet may be overwritten or deleted.

Note that in Step 346, since a length of the L-th packet is shorter than a packet referred by a specific characteristic value, the L-th packet may be merely stored in a temporary packet corresponding to the k-th item of said specific characteristic value. However, since other proceeding received packets, which are stored in the temporary packet corresponding to the k-th item as well, may have an accumulated length shorter than the packet referred by the specific characteristic value, a processing efficiency is reduced. Moreover, every time each succeeding received packet is stored, a check code of each said received packet, such as the checksum, is required to be checked also. Therefore, the processing efficiency is further reduced. In a preferred embodiment of the present invention, the check code of each received packet in the L-th packet is not checked until the accumulated length of the received packets stored in the temporary packet is exceeded. Besides, the check code of each of the succeeding received packet is not checked also until a length of the L-th packet exceeds a tail of a packet referred by a specific characteristic value in the preferred embodiment of the present invention. Therefore, a tradeoff is reached between the processing efficiency and precision of received packets. Moreover, when a timeout message is met before the tail of the packet referred by the characteristic value is exceeded by the accumulated length of the succeeding received packets, the L-th packet containing the succeeding received packets is abandoned from the temporary packet.

Figure 3:
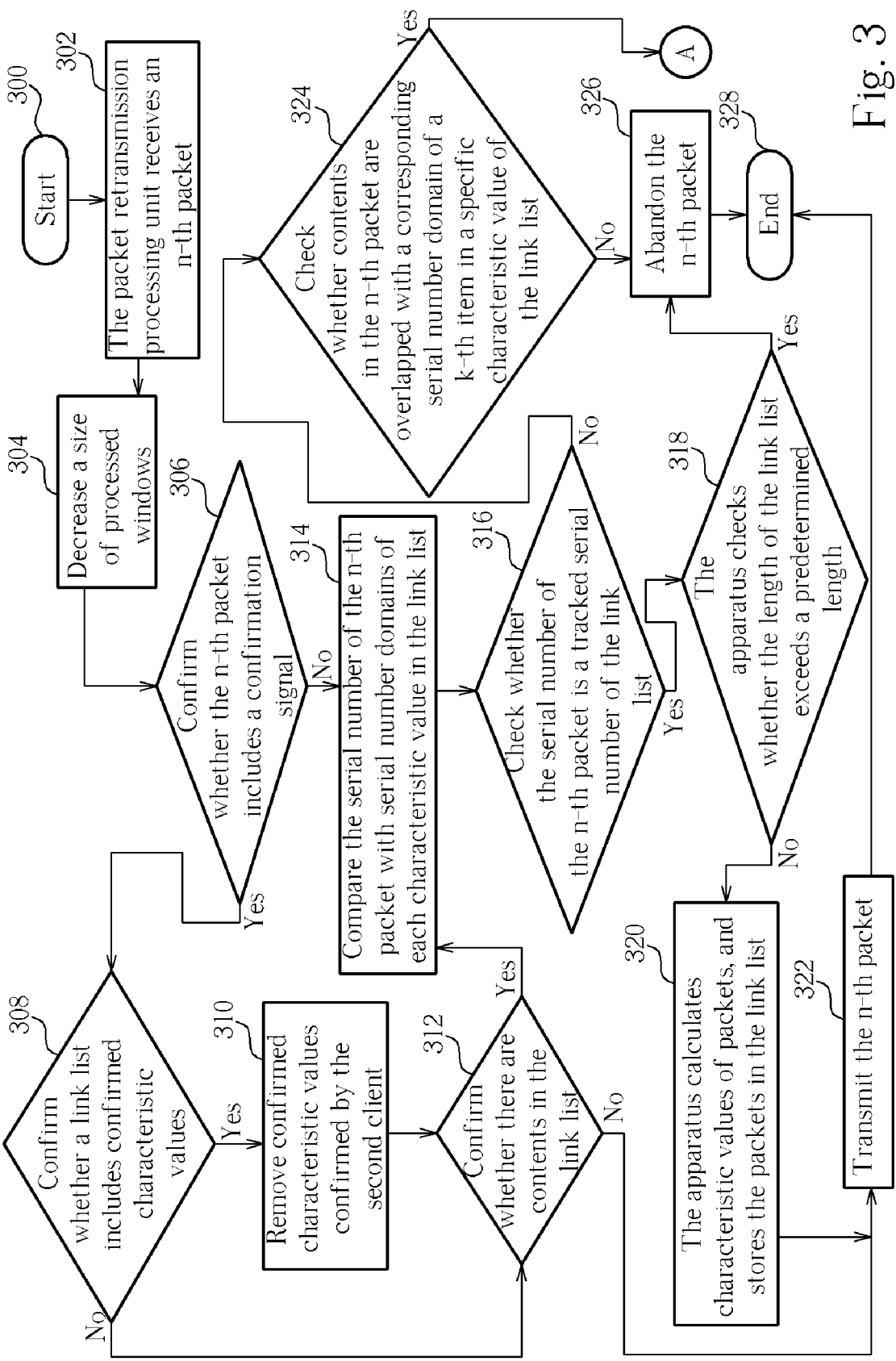
FIG. 3, FIG. 4, and FIG. 5 illustrate a flow chart illustrating a network flow/stream simulation method provided in the present invention for relieving defects caused by retransmitted packets after packets arrive at the apparatus shown in FIG. 1.
Figure 4:
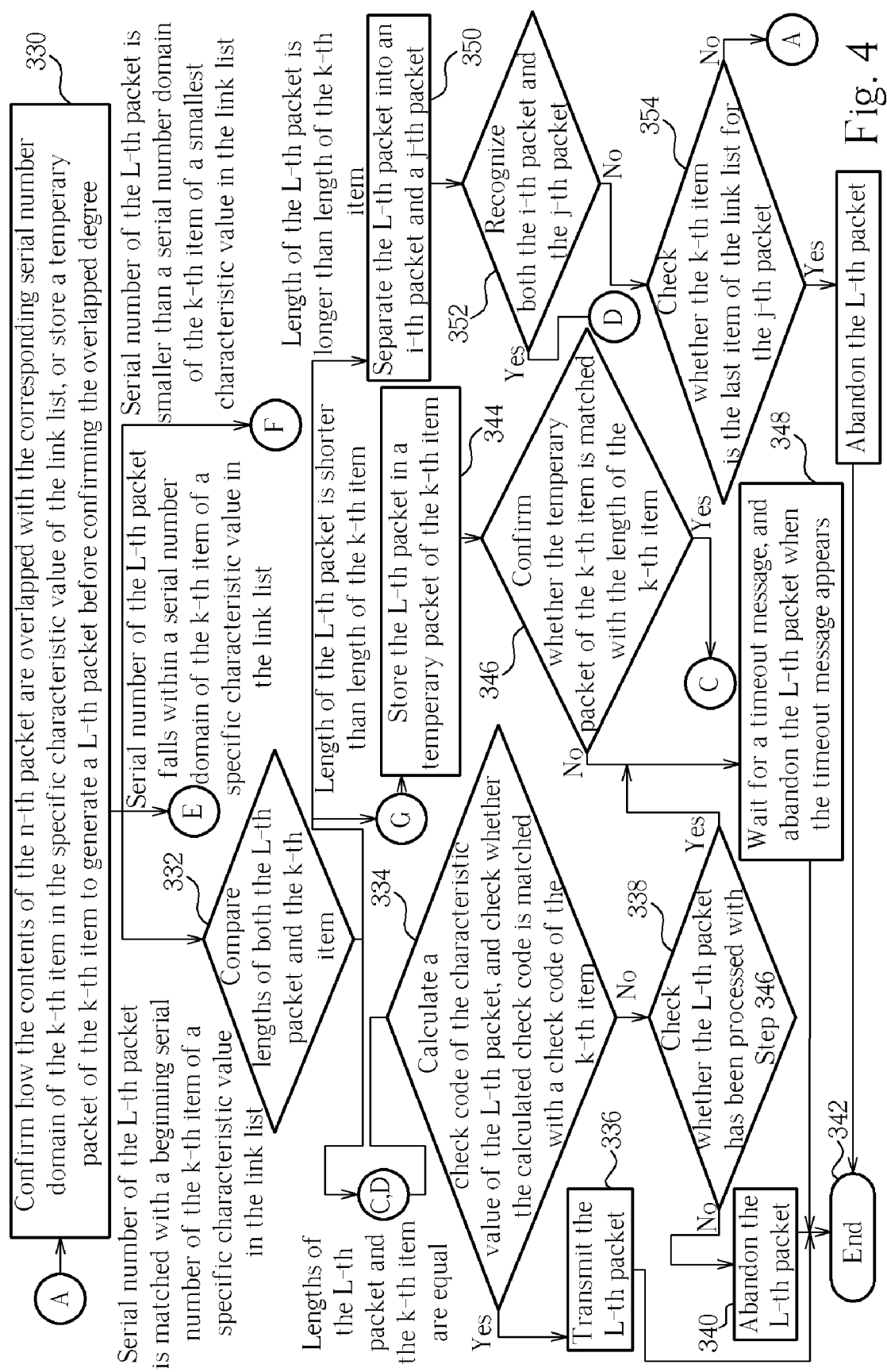
Figure 5:
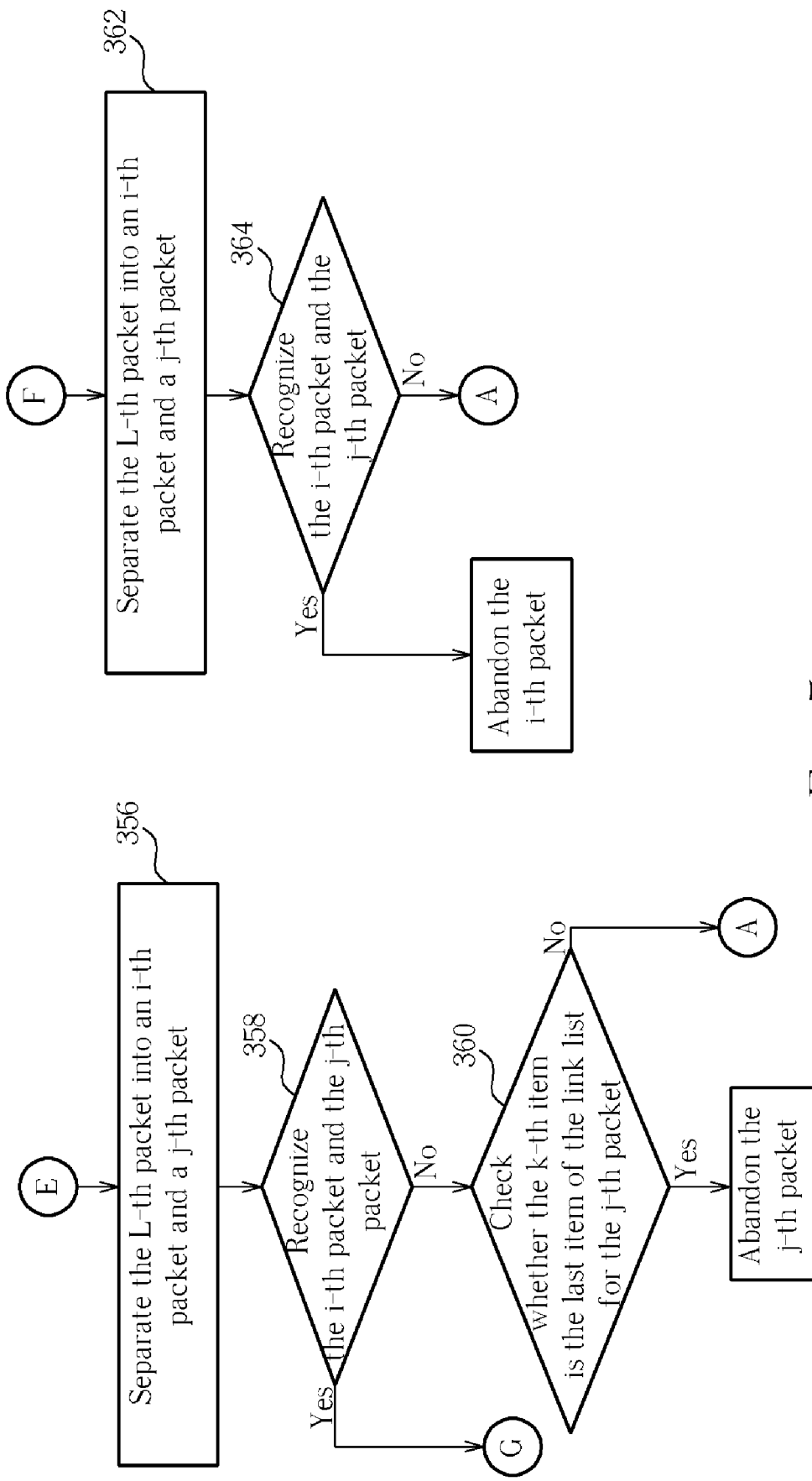
Figure 6:
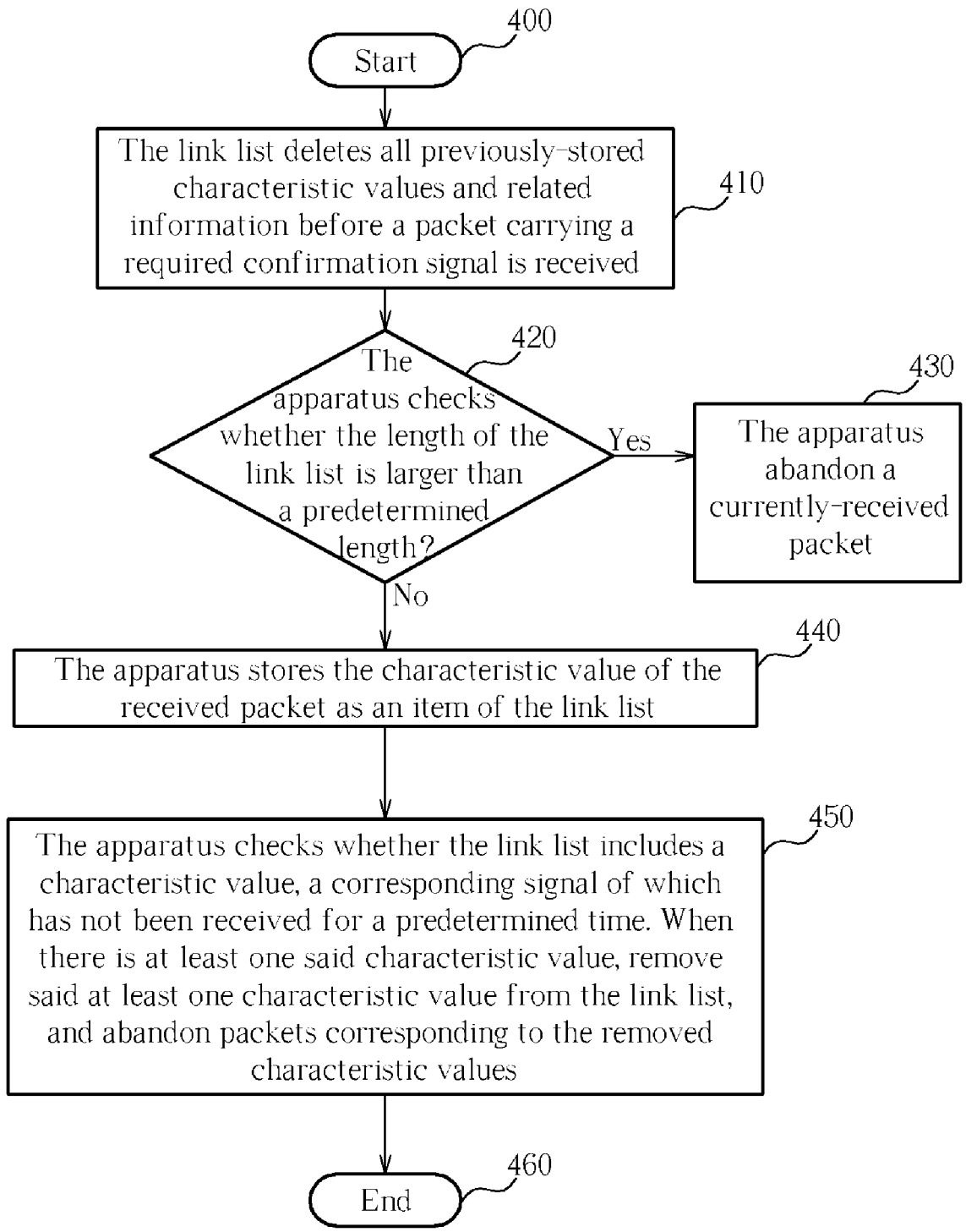
FIG. 6 illustrates a flow chart of how the link list described in FIG. 3, FIG. 4, and FIG. 5 operates.

In the steps shown in FIG. 3, FIG. 4, and FIG. 5, the link list stores a characteristic value of each packet under most cases, and the content of a packet under certain compulsive circumstances also. Moreover, storing a characteristic value requires a memory space of at least 8 bytes and at most 16 bytes. Therefore in comparison, utilizing the characteristic value in the present invention saves huge memory utility, whereas in the prior art, storing a whole content of each packet takes a memory space of at least several millions bytes. Note that a length of a characteristic value utilized above is far shorter than a length of the packet corresponding to the characteristic value. Please refer to FIG. 6, which illustrates a flow chart of how the link list described in FIG. 3, FIG. 4, and FIG. 5 operates. The steps of how the link list operates includes as follows:

Step 400: Start.

Step 410: The link list deletes all previously-stored characteristic values and related information before a packet carrying a required confirmation signal is received. Said previously-stored characteristic values may not be deleted completely from the link list for preserving certain confirmed characteristic values, and temporary packet related to the preserved and confirmed characteristic values are deleted.

Step 412: The apparatus 130 checks whether the length of the link list is larger than a predetermined length. When the length of the link list is longer than a predetermined length, go to Step 430; otherwise, go to Step 440.

Step 430: The apparatus 130 abandon a currently-received packet, and does not store a characteristic value of said currently-received packet so that the length of the link list is shorter than the predetermined length.

Step 440: The apparatus 130 stores the characteristic value of the received packet as an item of the link list.

Step 450: The apparatus 130 checks whether the link list includes a characteristic value, a corresponding signal of which has not been received for a predetermined time. When there is at least one said characteristic value, remove said at least one characteristic value from the link list, and abandon packets corresponding to the removed characteristic values.

Step 460: End.

The link list may be implemented with a queue for reaching the aim of first in first out (FIFO). Besides, the length of the link list described in FIG. 6 may be dynamically adjusted by the apparatus 130 according to both how many resources the apparatus 130 has and a requirement of the apparatus 130.

During sessions that are simulated in the present invention, the packet limiting unit pre-processes received packets before the received packets arrive at the apparatus 130 so that packets sent outward from said packet limiting unit are in sequences of serial numbers. In a succeeding procedure of transmitting several related confirmation signals to the first client as a transmission terminal, the transmission terminal is forced by said confirmation signals to preemptively transmit retransmitted packets, for preventing unnecessary delay caused by the fact that the transmission terminal cannot retransmit a packet until a timeout message is received.

After packets are sent outward by the packet limiting unit and received by the packet retransmission processing unit, with the fact that a packet must have an unique characteristic value, it is easily recognized whether a received packet is a retransmitted packet of a missed packet, which has been processed by the apparatus before, according to the characteristic value of said received packet. When a situation that packets of the same original data have not been collected entirely is found according to a packet length calculated by a characteristic value of a current tail packet belonging to said original data, the characteristic value of said tail packet is buffered in the link list in advance, and succeeding packets belonging to said original data continue to be waited for and received. When a predetermined length of the link list is exceeded by received packets before all packets of the original data are received, the packet unified by said received packets in the temporary packet is separated into a first packet having an appropriate small length and a second packet having a length equal to a length of the unified packet subtracted by the length of the first packet. The second packet is then processed further according to the network packet flow/simulation method shown in FIG. 3, FIG. 4, and FIG. 5. When the predetermined length of the link list has not been exceeded by received packets, or when a gathered length of the received packets has not reached a header of a next packet with respect to the original data, the received packets are stored first, and are deleted on an appropriate timing, such when a corresponding confirmation signal is received, or when a timeout message is received. Since bytes of the characteristic values utilized in the present invention are much less than the essences of the packets, and since it is barely required to store contents of packets under most cases, related memory utility is saved in the present invention, and moreover, the defect of the prior art, where increased memory utility, burden of retransmitted packets, and out of sequence packets cannot be relieved simultaneously, is also easily solved by the network flow/stream simulation method of the present invention. Besides, the network flow/stream simulation method of the present invention may also be solely operated on the third layer of Open Systems Interconnection Model so that a defect of reducing processing efficiency caused by inter-processes between various layers of Open Systems Interconnection Model is also relieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network flow/stream simulation method for processing retransmitted packets to save utilized memory after packets arrive at an apparatus, the method comprising:
(a) a packet retransmission processing unit receiving an n-th packet from a packet limiting unit;
(b) decreasing the window size of the processed packet;
(c) confirming whether the n-th packet includes a confirmation signal;
(d) confirming whether a link list includes confirmed characteristic values when the n-th packet includes the confirmation signal in step (c);
(d1) selectively deleting certain confirmed characteristic values for preserving certain updated characteristic values while certain packets are lost after passing the apparatus;
(e) removing confirmed characteristic values when the link list includes the confirmed characteristic values;
(f) confirming whether there are contents in the link list;
(g) comparing the serial number of the n-th packet with serial number domains of each characteristic value in the link list when there are contents in the link list in step (f), or when the n-th packet does not include the confirmation signal in step (c);
(h) checking whether the serial number of the n-th packet is a tracked serial number of the link list;
(i) the apparatus checking whether the length of the link list exceeds a predetermined length when the serial number of the n-th packet is a tracked serial number of the link list in step (h);
(j) the apparatus calculating characteristic values of packets and storing the characteristic values in the link list in serial number sequence when the length of the link list does not exceed the predetermined length in step (i);
(k) transmitting the n-th packet when there is no content in the link list in step (f), or after the apparatus has stored the characteristic values of the packets in the link list in step (j);
(l) checking whether contents in the n-th packet are overlapped with a corresponding serial number domain of a k-th item in a specific characteristic value of the link list when the serial number of the n-th packet is not the tracked serial number of the link list in step (h);
(m) abandoning the n-th packet when the contents of the n-th packet are not overlapped with the corresponding serial number domain of a k-th item in a specific characteristic value of the link list in step (l), or when the length of the link list exceeds the predetermined length in step (i);
(n) confirming how the contents of the n-th packet are overlapped with the corresponding serial number domain of the k-th item in the specific characteristic value of the link list when contents in the n-th packet are overlapped with the corresponding serial number domain of the k-th item in the specific characteristic value of the link list in step (l), or storing a temporary packet of the k-th item to generate a L-th packet before confirming the overlapped degree, wherein the L-th packet is generated from the n-th packet or the temporary packet of the k-th item;
(o) comparing lengths of both the L-th packet and the k-th item when the serial number of the L-th packet is matched with a beginning serial number of the k-th item of the specific characteristic value in step (n);
(p) calculating a check code of the characteristic value of the L-th packet, and checking whether the calculated check code is matched with a check code of the k-th item when the lengths of the L-th packet and the k-th item are equal in step (o);
(q) transmitting the L-th packet when the calculated check code is matched with the check code of the k-th item in step (p);
(r) storing the L-th packet in a temporary packet of the k-th item when the length of the L-th packet is shorter than the length of the k-th item in step (o);
(s) confirming whether the temporary packet of the k-th item is matched with the length of the k-th item;
(t) waiting for a timeout message when the L-th packet is not matched with the length of the k-th item in step (s), and abandoning the L-th packet when the timeout message appears;
(u) separating the L-th packet into an i-th packet and a j-th packet when the length of the L-th packet is longer than the length of the k-th item in step (o), wherein the i-th packet starts at a serial number of the L-th packet, a length of the i-th packet equals to the length of the k-th item, and a length of the j-th packet equals to a difference generated by subtracting the length of the L-th packet by the length of the k-th item;
(v) recognizing both the i-th packet and the j-th packet, and performing step t) on the i-th packet after the i-th is recognized;

(w) checking whether the k-th item is the last item of the link list for the j-th packet after recognizing the j-th packet in step (v); and performing step (i) on the j-th packet when the k-th item is the last item of the link list, otherwise, performing step (n) on the j-th packet;

(x1) separating the L-th packet into a x-th packet and a y-th packet when the serial number of the L-th packet falls within a serial number domain of the k-th item of a specific characteristic value in the link list, wherein the x-th packet starts at the serial number of the L-th packet and ends at the end of the k-th item, and the length of the y-th packet equals the difference generated by subtracting the length of the L-th packet by the length of the x-th packet;

(x2) recognizing the x-th packet and the y-th packet, and performing step (r) on the x-th packet after the x-th packet is recognized;

(x3) checking whether the k-th item is the last item of the link list for the y-th packet, and performing step (i) on the y-th packet when the k-th item is the last item of the link list, otherwise, performing step (n) on the y-th packet;

(y1) separating the L-th packet into a s-th packet and a t-th packet, wherein the t-th packet staffs at a start serial number of the k-th item and ends at a tail serial number of the L-th packet, and the s-th packet staffs at a start serial number of the L-packet and ends at a tail serial number of the k-th item; and (y2) recognizing the s-th packet and the t-th packet, and performing step (n) on the t-th packet after recognizing the t-th packet.

2. The network flow/stream simulation method of claim 1 wherein step (x3) further comprises:
performing step (i) on the y-th packet when the k-th item is the last item of the link list for the y-th packet.

3. The network stream simulation method of claim 1 wherein step (y2) further comprises:
abandoning the s-th packet after recognizing the s-th packet.

4. The network flow/stream simulation method of claim 1 wherein step (p) further comprises:
checking whether the L-th packet has been processed with step (s) when the calculated check code is not matched with the check code of the k-th item;
performing step (t) when the L-th packet has been processed with step (s); and
abandoning the L-th packet when the L-th packet has not been processed with step (s).

5. The network flow/stream simulation method of claim 1 wherein a check code of a packet is a vector space abiding by both the associativity law and the commutativity law.

6. The network flow/stream simulation method of claim 5 wherein the check code of the packet is implemented with a checksum utilized in the transmission control protocol.

7. The network flow/stream simulation method of claim 5 wherein the check code of the packet is a self-constructed vector space function.

8. A network flow/stream simulation method for arranging packets in order before the packets enter an apparatus and for processing retransmitted packets to save utilized memory after packets arrive at the apparatus, the method comprising:

(z1) abandoning packets having serial numbers out of sequence with serial numbers of other packets;

(z2) transmitting a request to a client for retransmitting missing packets;

(z3) reducing a size of a window regulated by a communication protocol applied by the client;

(z4) utilizing a queue for buffering packets having out of sequence serial numbers;

(a) a packet retransmission processing unit receiving an n-th packet from a packet limiting unit;

(b) decreasing the window size of the processed packet;

(c) confirming whether the n-th packet includes a confirmation signal;

(d) confirming whether a link list includes confirmed characteristic values when the n-th packet includes the confirmation signal in step (c);

(d1) selectively deleting certain confirmed characteristic values for preserving certain updated characteristic values while certain packets are lost after passing the apparatus;

(e) removing confirmed characteristic values when the link list includes the confirmed characteristic values;

(f) confirming whether there are contents in the link list;

(g) comparing the serial number of the n-th packet with serial number domains of each characteristic value in the link list when there are contents in the link list in step (f), or when the n-th packet does not include the confirmation signal in step (c);

(h) checking whether the serial number of the n-th packet is a tracked serial number of the link list;

(i) the apparatus checking whether the length of the link list exceeds a predetermined length when the serial number of the n-th packet is a tracked serial number of the link list in step (h);

(j) the apparatus calculating characteristic values of packets and storing the characteristic values in the link list in serial number sequence when the length of the link list does not exceed the predetermined length in step (i);

(k) transmitting the n-th packet when there is no content in the link list in step
(f), or after the apparatus has stored the characteristic values of the packets in the link list in step (j);

(l) checking whether contents in the n-th packet are overlapped with a corresponding serial number domain of a k-th item in a specific characteristic value of the link list when the serial number of the n-th packet is not the tracked serial number of the link list in step (h);

(m) abandoning the n-th packet when the contents of the n-th packet are not overlapped with the corresponding serial number domain of a k-th item in a specific characteristic value of the link list in step (l), or when the length of the link list exceeds the predetermined length in step (i);

(n) confirming how the contents of the n-th packet are overlapped with the corresponding serial number domain of the k-th item in the specific characteristic value of the link list when contents in the n-th packet are overlapped with the corresponding serial number domain of the k-th item in the specific characteristic value of the link list in step (l), or storing a temporary packet of the k-th item to generate a L-th packet before confirming the overlapped degree, wherein the L-th packet is generated from the n-th packet or the temporary packet of the k-th item;

(o) comparing lengths of both the L-th packet and the k-th item when the serial number of the L-th packet is matched with a beginning serial number of the k-th item of the specific characteristic value in step (n);

t) calculating a check code of the characteristic value of the L-th packet, and checking whether the calculated check code is matched with a check code of the k-th item when the lengths of the L-th packet and the k-th item are equal in step (o);

(q) transmitting the L-th packet when the calculated check code is matched with the check code of the k-th item in step (p);
(r) storing the L-th packet in a temporary packet of the k-th item when the length of the L-th packet is shorter than the length of the k-th item in step (o);
(s) confirming whether the temporary packet of the k-th item is matched with the length of the k-th item;
(t) waiting for a timeout message when the L-th packet is not matched with the length of the k-th item in step (s), and abandoning the L-th packet when the timeout message appears;
(u) separating the L-th packet into an i-th packet and a j-th packet when the length of the L-th packet is longer than the length of the k-th item in step (o), wherein the i-th packet starts at a serial number of the L-th packet, a length of the i-th packet equals to the length of the k-th item, and a length of the j-th packet equals to a difference generated by subtracting the length of the L-th packet by the length of the k-th item;
(v) recognizing both the i-th packet and the j-th packet, and performing step t) on the i-th packet after the i-th is recognized;
(w) checking whether the k-th item is the last item of the link list for the j-th packet after recognizing the j-th packet in step (v); and performing step (i) on the j-th packet when the k-th item is the last item of the link list, otherwise, performing step (n) on the j-th packet;
(x1) separating the L-th packet into a x-th packet and a y-th packet when the serial number of the L-th packet falls within a serial number domain of the k-th item of a specific characteristic value in the link list, wherein the x-th packet staffs at the serial number of the L-th packet and ends at the end of the k-th item, and the length of the y-th packet equals the difference generated by subtracting the length of the L-th packet by the length of the x-th packet;
(x2) recognizing the x-th packet and the y-th packet, and performing step (r) on the x-th packet after the x-th packet is recognized;
(x3) checking whether the k-th item is the last item of the link list for the y-th packet, and performing step (i) on the y-th packet when the k-th item is the last item of the link list, otherwise, performing step (n) on the y-th packet;
(y1) separating the L-th packet into a s-th packet and a t-th packet, wherein the t-th packet staffs at a staff serial number of the k-th item and ends at a tail serial number of the L-th packet, and the s-th packet staffs at a staff serial number of the L-packet and ends at a tail serial number of the k-th item; and
(y2) recognizing the s-th packet and the t-th packet, and performing step (n) on the t-th packet after recognizing the t-th packet.

9. The network flow/stream simulation method of claim 8 wherein abandoning packets having out of sequence serial numbers comprises:
checking whether there are packets having a same serial number; and
preserving one of a plurality of packets having a same serial number, and removing the remaining packets except for the preserved one.

10. The network flow/stream simulation method of claim 8 wherein transmitting a request to a client for retransmitting missing packets comprises:
transmitting at least three consecutive confirmation signals to the client every time.

11. The network flow/stream simulation method of claim 8 being applied on reliable transmission protocols.

12. The network flow/stream simulation method of claim 8 being applied on the transmission control protocol.

13. The network flow/stream simulation method of claim 8 being applied on the sequenced packet exchange protocol.

14. The network flow/stream simulation method of claim 8 wherein a check code of a packet is a vector space abiding by both the associativity law and the commutativity law.

15. The network flow/stream simulation method of claim 8 wherein the check code of the packet is implemented with a checksum utilized in the transmission control protocol.

16. The network flow/stream simulation method of claim 8 wherein the check code of the packet is a self-constructed vector space function.

17. The network flow/stream simulation method of claim 8 wherein step (x3) further comprises:
performing step (i) on the y-th packet when the k-th item is the last item of the link list for the y-th packet.

18. The network stream flow/stream simulation method of claim 8 wherein step (y2) further comprises:
abandoning the s-th packet after recognizing the s-th packet.

19. The network flow/stream simulation method of claim 8 wherein step (p) further comprises:
checking whether the L-th packet has been processed with step (s) when the calculated check code is not matched with the check code of the k-th item;
performing step (t) when the L-th packet has been processed with step (s); and
abandoning the L-th packet when the L-th packet has not been processed with step (s).

* * * * *